United States Patent
Keinonen et al.

(10) Patent No.: US 6,959,207 B2
(45) Date of Patent: Oct. 25, 2005

(54) MOBILE EMOTIONAL NOTIFICATION APPLICATION

(75) Inventors: Turkka Keinonen, Huhmari (FI); Juha Hemanus, Helsinki (FI)

(73) Assignee: Nokia Corporation, Espoo (FI)

( * ) Notice: Subject to any disclaimer, the term of this patent is extended or adjusted under 35 U.S.C. 154(b) by 535 days.

(21) Appl. No.: 09/745,515

(22) Filed: Dec. 22, 2000

(65) Prior Publication Data

US 2002/0082054 A1 Jun. 27, 2002

(51) Int. Cl.[7] .............. H04M 1/00; H04M 11/00; H04Q 7/20; H04B 1/38
(52) U.S. Cl. .............. 455/567; 455/412.1; 455/412.2; 455/466; 455/550.1
(58) Field of Search .............. 455/41.2, 42.3, 455/412.1, 412.2, 413, 414.1, 414.2, 415, 418–419, 420, 424–425, 456.3, 458, 460–462, 466, 550.1, 517, 557, 74.1, 551, 552.1, 553.1, 567, 569.2

(56) References Cited

U.S. PATENT DOCUMENTS

| | | | |
|---|---|---|---|
| 5,054,051 A | 10/1991 | Hoff | |
| 5,054,594 A | 10/1991 | Kämpf et al. | |
| 5,426,594 A | 6/1995 | Wright et al. | 364/514 |
| 5,635,897 A | 6/1997 | Kuo | 340/311.1 |
| 5,845,219 A * | 12/1998 | Henriksson | 455/567 |
| 5,973,612 A | 10/1999 | Deo et al. | |
| 6,032,039 A * | 2/2000 | Kaplan | 455/413 |
| 6,032,053 A * | 2/2000 | Schroeder et al. | 455/553.1 |
| 6,064,421 A | 5/2000 | Pohl | 348/14 |
| 6,125,287 A | 9/2000 | Cushman et al. | 455/566 |
| 6,175,741 B1 * | 1/2001 | Alperovich | 455/458 |
| 6,545,988 B1 * | 4/2003 | Skog | 370/329 |
| 6,571,103 B1 * | 5/2003 | Novakov | 455/464 |
| 2002/0032020 A1 * | 3/2002 | Brown et al. | 455/414 |

FOREIGN PATENT DOCUMENTS

| | | | |
|---|---|---|---|
| DE | 199 22 068 A1 | 11/2000 | H03M/7/30 |
| EP | 0 378 775 B1 * | 7/1990 | H04M/1/274 |
| EP | 0 986 272 A2 | 3/2000 | H04Q/7/12 |

OTHER PUBLICATIONS

RD 417007 A, Dec. 1998, Eriksson Inc. (Assignee).*

* cited by examiner

Primary Examiner—William Trost
Assistant Examiner—Meless Zewdu
(74) Attorney, Agent, or Firm—Cohen, Pontani, Lieberman & Pavane

(57) ABSTRACT

In an emotional notification system, information about another party is entered into and stored in a terminal of a first party along with one or more data objects associated with the second party (such as an email from, to or about the second party, a file originated by the second party, etc.). Each time the first party activates at his terminal through an interface module a data object associated with a second party, a notifying message is sent to the second party to make the second party aware that the first party is devoting attention to the second party and to promote bonding between the two parties. The notifying message may take one of various, preferably unobtrusive forms, such as a vibration of a terminal belonging to the second party, which minimizes any distraction caused by the notifying message.

28 Claims, 7 Drawing Sheets

"THE SUBJECTS"

MOBILE EMOTIONAL NOTIFICATION APPLICATION

BACKGROUND OF THE INVENTION

1. Field of the Invention

This invention relates to a system and a method for communication with terminals in telecommunications network, and especially providing means for notifying a person, that other persons are devoting their attention to that person.

2. Description of the Related Art

Recent studies have shown that telecommunication terminals, such as phones, and especially mobile phones or other types of mobile communication terminals, are not only used for communicating information between individuals, but also for creating a feeling of togetherness and friendship. People often send messages, such as email, short messages, or voice mail, to each other just to "keep the line open" between them, i.e., to remind one another to stay in touch and to make the receiver of the message aware that she is personally significant to the sender of the message. Especially close friends and family members appreciate these types of messages because of the knowledge that the message senders are thinking about them.

These studies have also shown that people, and especially teenagers, attach a special emotional meaning to electronically-represented data objects, such as received email messages, phonebook entries and avatars, that they associate with particular persons to whom they feel an affinity. The persons who maintain these data objects on their terminals view, read, arrange, save, access, and/or otherwise activate the data objects to recreate their social world.

Present messaging solutions do not optimally support the sending of these kinds of messages because these solutions require a user to create message content, whereas the building of a bond or link between individuals calls for solutions that are more intimate and more integrated to other forms of emotional thinking. Messaging solutions are needed for bonding or linking people with each other without requiring a cognitive effort of creating substantive content/information, such as a written message, to be prepared by one or more of the people and then sent to the other people to whom one desires to bond or "link".

In a communication terminal, and particularly a mobile communication terminal, there are several ways in which other people may be electronically "represented" by a data object. These include an entry in an electronic phonebook or on an electronic contact card, and textual, voice, picture and video messages received from that person and stored in and/or displayed on the device.

In present solutions, the two phenomena described above, namely, communication to increase the bonding of people without requiring the creation of content and considering data objects as emotional representations of a person, are separate and independent, although in some users' minds and actions these phenomena are highly interrelated. Linking the activation of the data objects associated with an individual in a communication terminal with emotional, cohesion building messaging toward that particular person would enhance the emotional meaning of telecommunication.

Currently, the telecommunication field is heavily focused on communication of information content using interfaces that primarily provide audio and visible output. The field is less focused on applications that offer other types of outputs such as a tactile output to be generated as part of a silent call or a message announcement. Communicating emotional cohesion seeking behavior with a tactile universal interface (UI) would add a whole new dimension to mobile communication.

Email applications have features which enable a sender of a message to receive a reply email message notifying the message sender when a sent message has been opened by the recipient. However, existing email programs provide a notification only when the message is opened for the first time and the message provided is only a text message to be viewed on a display rather than some other less intrusive notification means that can use a different medium other than text on a display to provides a notification. Also, the existing email notification system is an asynchronous "pull" system in which the person who receives notification needs to download the content of her inbox (whereas an emotional notification optimally requires a real-time "push" of information sent directly to the terminal). As such, existing email programs are not designed to support the emotional cohesion of mutually significant persons.

SUMMARY OF THE INVENTION

To overcome limitations in the prior art described above, and to overcome other limitations that will become apparent upon reading and understanding the present specification, the present invention discloses a system, apparatus and method for communicating services to a wireless terminal operating within a wireless network. The wireless device is not limited to any preset navigation structure, and provides the ability to remotely access services.

In accordance with one embodiment of the invention, a communication system between terminals comprises at least two terminals communicating with each other, and an interface module that enables access to a data object associated with a second party for controlling the data object with a terminal of a first party. The communication system further comprises a notifying message to be sent substantially instantly to at least a predefined terminal of the second party each time the data object is activated by the terminal of the first party.

In accordance with a second embodiment of the invention, a method of communicating messages between terminals in a communication system is provided. The method comprises activating with a terminal of a first party through an interface module a data object associated with a second party, and sending a notifying message substantially instantly to at least a predefined terminal of the second party each time the data object is activated by the terminal of the first party.

In accordance with a third embodiment of the invention, a mobile terminal that communicates with other terminals comprises a processor, a storage device and a software means operative on the processor. The software means comprises means for maintaining in the storage device a database listing identified communication partners of a party, means for associating data objects with the identified communication partners, means for periodically scanning whether any of the associated data objects is being activated, and means for sending a notifying message to at least one of the identified communication partners substantially instantly each time one of the data objects is activated.

In accordance with a fourth embodiment of the invention, a method is provided for notifying a terminal of a first party operating in a wireless communication network that a second party has manipulated an electronic representation of the first party. The method comprises associating a first party with an electronic representation of the first party, manipulating by a second party of the electronic representation associated with the first party using an input device, and sending a notification from the second party to the first party upon the manipulation of the electronic representation associated with the first party.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

Figure 1:
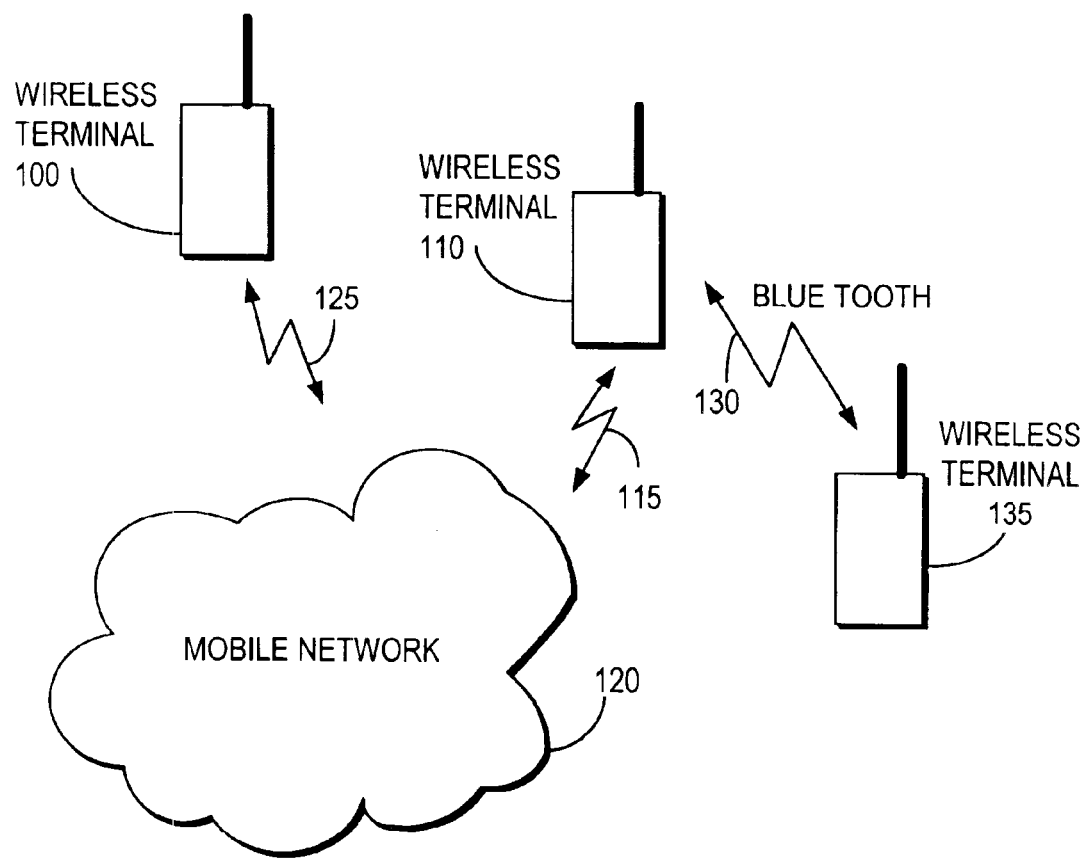
FIG. 1 depicts a block diagram of a system architecture used according to an embodiment of the invention.

Referring to FIG. 1, a communication system according to one embodiment of the invention provides one or more users with wireless terminals 100, 110, such as a mobile phone, a personal digital assistant (PDA), or another terminal that wirelessly links to a wireless communications network, for example, a mobile or wireless network. Wireless terminals 100, 110 may communicate with each other and permit messages to be sent between terminals. The wireless terminals 100, 110 are capable of presenting data in various ways such as text, voice, audio, and multimedia and may also be capable of producing a tactile output, either at the terminals themselves or at a device linked to one of the terminals, that alerts a user of an incoming notifying message. The wireless terminals 100, 110 may be connected or be under coverage of one or more mobile networks.

FIG. 1 illustrates an example where terminals 100 and 110 are connected to a single mobile network 120. The mobile network 120 may be any type of wireless communication network or combination of networks, including, but not limited to, GSM (Global Standard for Mobile/Groupe Speciale Mobile), GPRS (General Packet Radio System), UMTS (Universal Mobile Telephone System) or 3G (Third generation of mobile communications), where 3G can be compatible with GSM, HSCSD (High Speed Circuit Switched Data), GPRS, EDGE (Enhanced Data Rates for Global/GSM Evolution) and WCDMA (Wideband Code Division Multiple Access). Various other network systems can also be supported in 3G, such as CDMA (Code Division Multiple Access), PDC (Personal Digital Communications), or CDMA2000. The mobile network 120 may also be WLAN (Wireless Local Area Network). The transmission may also be broadcast via DAB (Digital Audio Broadcasting) or DVB (Digital Video Broadcasting). Terminals 100, 110 may be linked to the mobile network 120 by communication links 115, 125, such as links that permit communications substantially in real time. In typical applications the notifying message is reciprocal, but a one-way link is also possible. One or both wireless terminals 100, 110 may additionally be linked via a short range communication link 130, such as a Bluetooth link, to a respective nearby external notification device 135, also having a short range transceiver, that can be used, as will be explained below, to receive the notifying message and notify a person regarding the activation (or manipulation) of a data object (electronic representation) associated with a user. Alternatively, a fixed terminal (not shown), such as a personal computer or a Web TV terminal may be used for communicating with other fixed terminals, or with mobile terminals 100, 110 over a wired and/or wireless network so that an activation of the data object on the fixed terminal causes a notifying message (notification) to be transmitted to another user.

Figure 2:
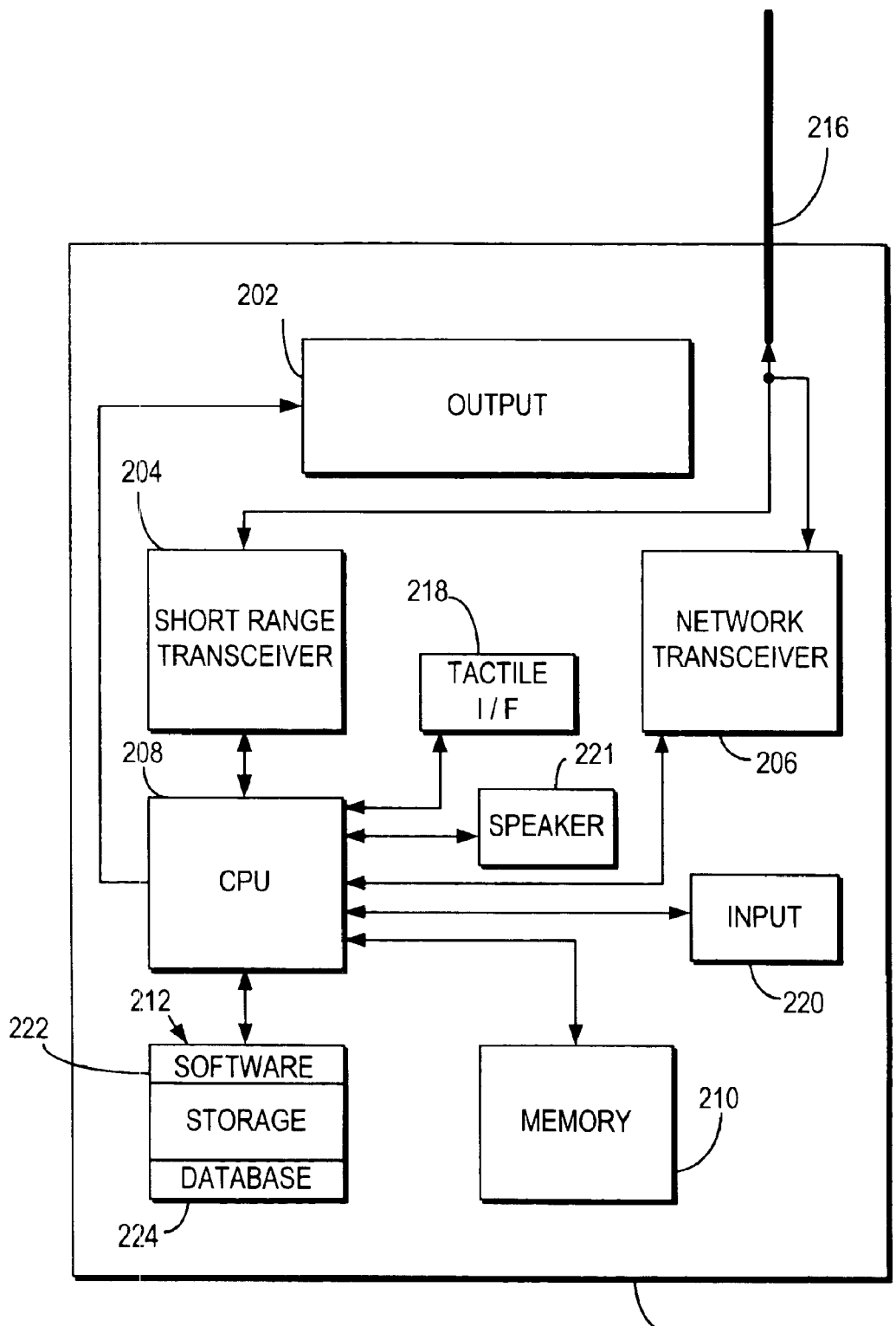
FIG. 2 depicts a block diagram of a wireless terminal showing components used according to an embodiment of the invention in the terminal.

FIG. 2 is a simplified illustration of mobile terminal 100 according to one embodiment of the invention showing various components used to perform the procedures of this invention. The mobile terminal 100, for example, has various components (mobile terminal 110 may generally have the same hardware and software components) comprising a display 202 that allows, for example, the user to visually read information and may be provided with the capability of displaying multimedia information such as video. The mobile terminal 100 further comprises a network transceiver 206 to receive transmissions from and to transmit requests to the mobile network 120, a central processing unit (CPU) 208 for controlling and executing all necessary procedures, a memory 210 and a data storage 212. The data storage 212 can also be used to store and retrieve the user information and data object associated with the users, especially if the mobile terminal is capable of processing and storing large amounts of data. The data storage 212 can be, for example, a hard disk magnetic or optical storage unit, as well as a CD-ROM drive or a flash memory. Mobile terminal 100 also comprises an antenna 216, and one or more inputs 220 for inputting the information into the terminal. Input 220 or means for input may be, for example, a numeric keypad, a keyboard, a software keyboard touch screen, a touch screen (in combination with the display 202), a mouse, a pointing device such as pointing pen, etc. In the case of DVB or DAB, the terminal must also have a DVB or DAB receiver (not shown). The mobile terminal 100 may provide voice or sound output through a speaker 221.

At any terminal that receives notifying messages as well as sends them, which can include terminal 100, there may be a tactile interface 218 to receive notifying messages which notify the terminal user that a data object associated with her at another terminal has been activated. Alternatively, a terminal 100 receiving notifying messages may also comprise a short range transceiver 204 to enable communication with a separate notification device 135 to provide a notifying message to the subject associated with the data object was activated. This tactile interface 218 or notification device 135 provides a tactile output such as a vibration, a deformation, a change in temperature or some other notification means that is intimate and attention-catching but preferably unobtrusive to others. Other types of outputs, such as a light or sound output, may be used to notify a terminal user as an alternative to or in addition to the tactile output.

Software 222 resident on terminal 100 can be used to access data in a subject database 224 wherein information is saved regarding other persons who utilize with the communication system and with whom the terminal user has an emotional connection. These persons may be referred to as "communication partners" or "subjects". Software 222 can also be used to associate a data object with a particular communication partner, to activate the data objects and to generate and send notifying messages.

Figure 3A:
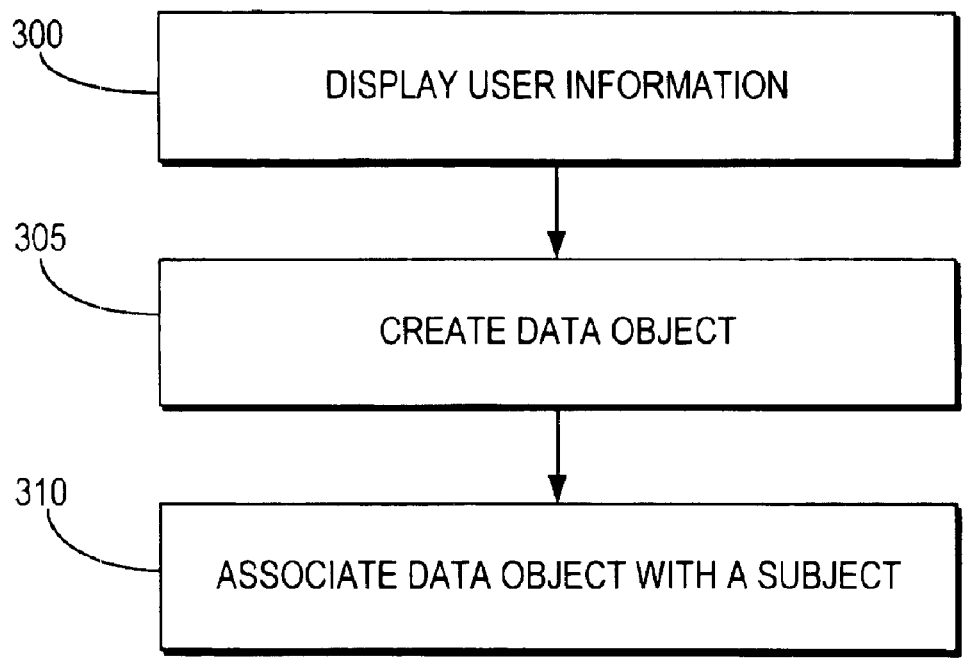
FIGS. 3A and 3B illustrate flow charts of steps for performing the method of an exemplary embodiment of the invention.
Figure 3B:
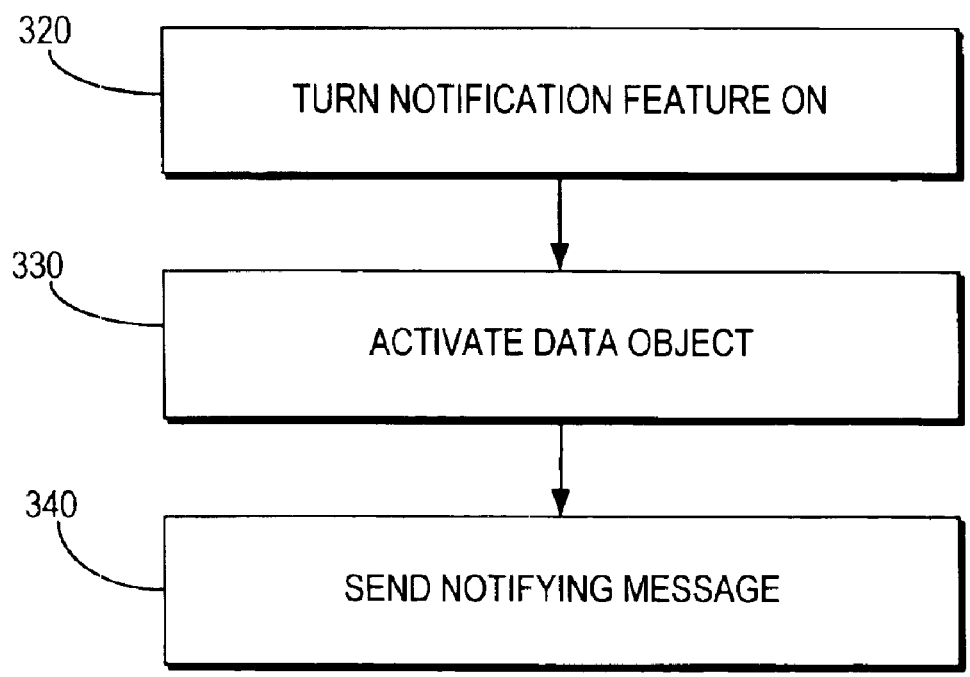
Figure 4:
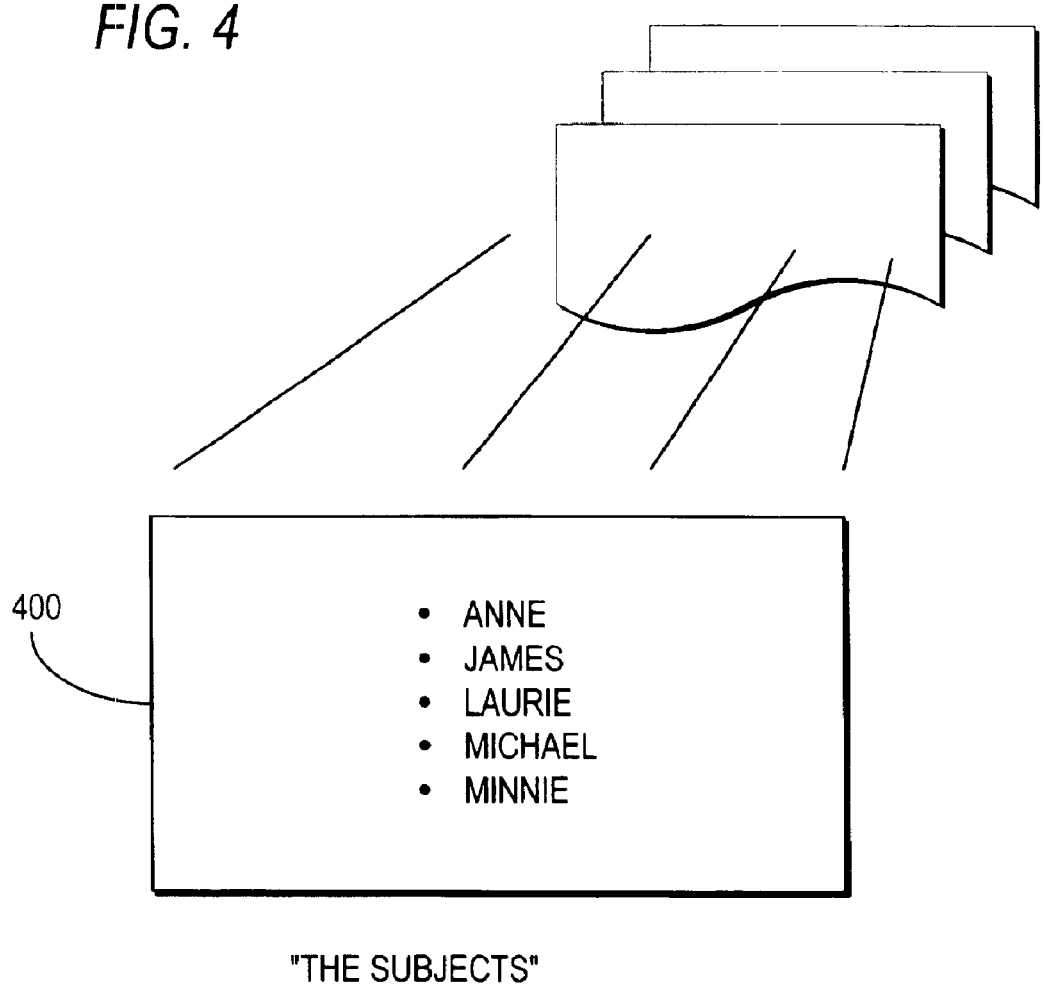
FIG. 4 depicts a listing of multiple users for whom user information is entered in person A's terminal according to the exemplary embodiment of the invention.

FIGS. 3A and 3B illustrate the method for sending a notifying message between users of the notification system. At step 300, user information stored in database 224 is optionally displayed on display 202 using software 222. For example, in one possible interface, persons who are communication partners of the user of terminal 100 are included in the user's on-board phone directory. The communication partners, who are connected to the notification system of the present invention, may be displayed in a first window 400 on the display 202 of terminal 100, as shown in FIG. 4 embodying one possibility of the invention. Each communication partner is assigned a "subject number" that uniquely identifies a particular communication partner to the system and is used to associate a data object with a particular communication partner. Various contact information related to these persons may also be stored in the database 224 or may be stored at a network element accessible to mobile terminal 100. This contact information may be retrieved by a user and the user may scroll through the retrieved list of communication partners and select a particular record for display by clicking on or otherwise selecting one of the displayed names (in the example shown in FIG. 4, one selects the name Minnie and presses an "enter" button) using input device 220. (The selection of a person's name in a directory will typically trigger the sending of a notifying message.) This record selection causes another window 425 to be displayed in which contact information, such as Minnie's home address, nickname, landline phone number, email address(es), mobile phone number, and different links and labels to objects referring to Minnie, is displayed as plain text. At this point, the contact information about the person may be updated. This information about Minnie may be either entered by the user into terminal 100 or otherwise obtained and loaded into terminal 100 such as by downloading the information from a computer.

At step 305, one or more data objects relating to the displayed persons (communication partners) are created at terminal 100 or are imported or otherwise received and stored at terminal 100 in the database 224 or elsewhere in the system such as in a separate database. These data objects may include such things as emails, other text messages or objects, short message system messages, images, pictures, video clips, audio clips, animations or any type of data. A data object may also be created by a communication event such as a receipt of a file from a communication partner or a log of phone conversations with that person.

The data objects are associated with a particular communication partner (step 310) by virtue of the data object denoting in some way a relationship between the data object and the communication partner. The association of a particular communication partner with a particular data object at terminal 100 may be originated by the sender of the data object, where the data object was received from another person (possibly the communication partner at terminal 110), or the association may have been created by the user at terminal 100. In either case, the association of the communication partner and data object may be performed either explicitly by invoking a command to assign a subject number to a data object or implicitly where the data object is received with some indicator indicating that it relates to the communication partner (e.g., a mobile phone number or an email address). A data object may be associated with a particular communication partner by the user for any reason, such as because the communication partner is at least one of the source, originator, target, or subject of the data object (whether data or a communication event). The association information created by the user is stored as "association data" in database 224. The communication partner represented by a particular data object may be indicated by an indication displayed on or adjacent to the data object once the data object is associated with the subject. The displayed indication may be a label or a link, such as a hyperlink, to such information about the person represented.

Figure 5:
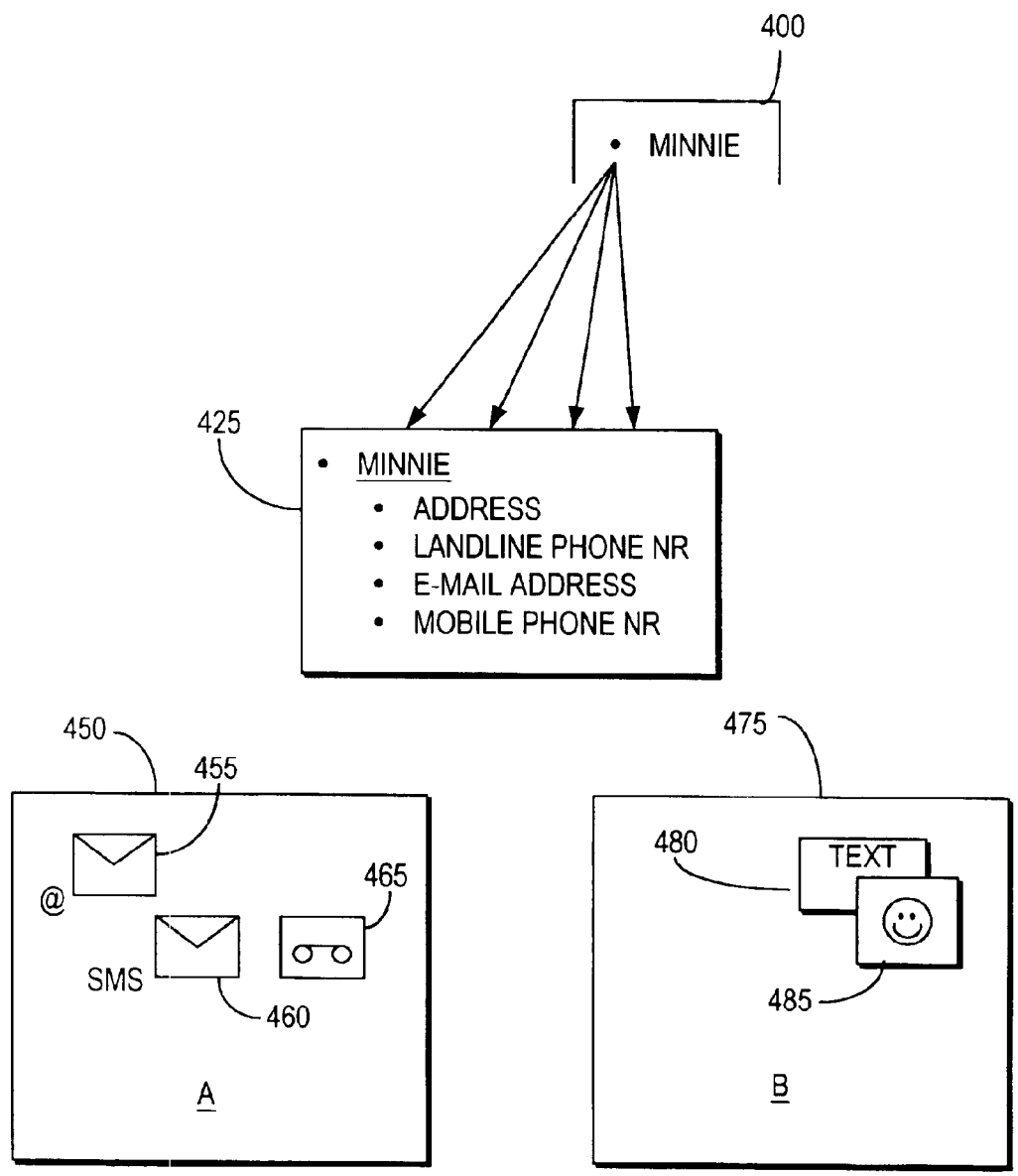
FIG. 5 depicts two screens, the first screen depicting user information for a particular one of the users in the listing of FIG. 4, and the second screen depicting some possible data objects associated with the particular user according to an embodiment of the invention.

The data objects may be presented as icons on window 450, as shown in FIG. 5 embodying one possibility of the invention, which could illustrate different types of files with different icons stored in storage 212. These data objects may include icons representing an email message received from or sent to Minnie 455, a short message system text message (SMS) received from or sent to Minnie 460, and Minnie's mobile phone number 465. An alternative display of data objects stored in terminal 100 for Minnie are shown in a separate window 475 and may comprise a display of text 480 and pictures 485.

Figure 6:
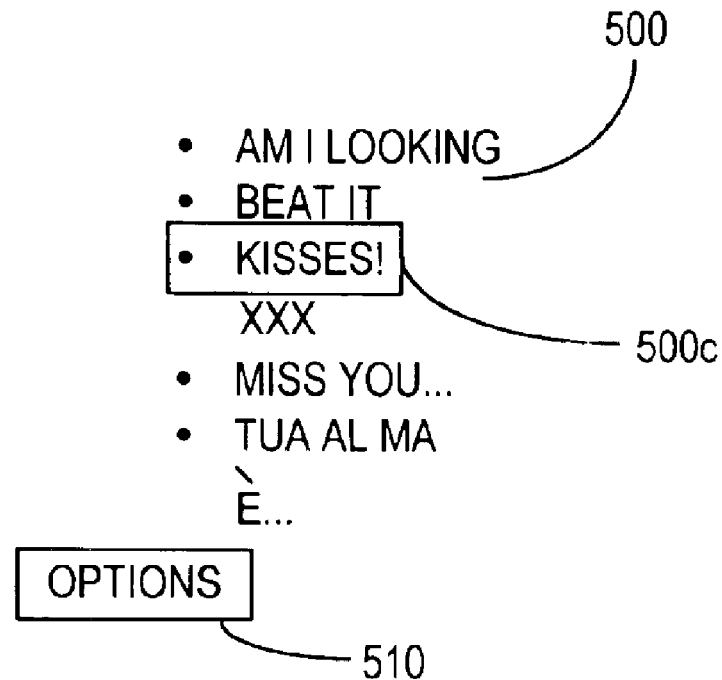
FIG. 6 illustrates exemplary selection of an email from a list of emails that are data objects associated with the particular user.
Figure 7:
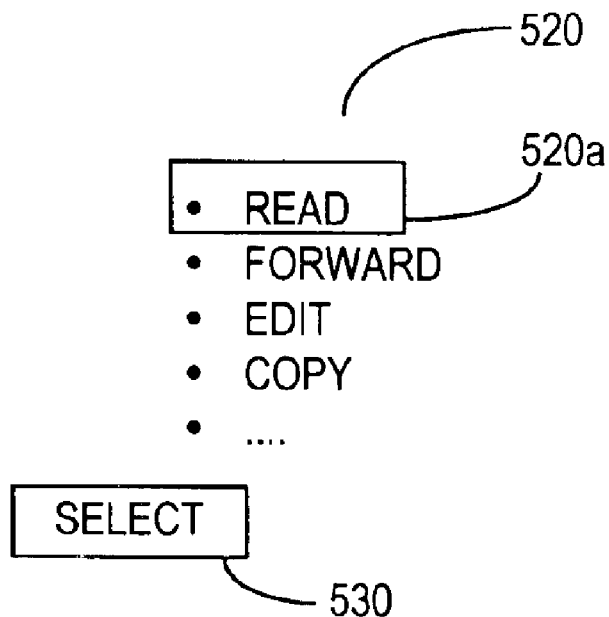
FIG. 7 illustrates the exemplary selection of a command for activating the selected email.

A sample list 500 (e.g., a list of emails) of a user's email data objects associated with a particular communication partner is shown in FIG. 6 embodying one aspect of the invention. The user may scroll through the list 500 and highlight or otherwise select a desired data object in the list (e.g., Kisses! 500c) to be activated and may obtain a menu of options of how to activate the selected item by pressing (or clicking) on the options button 510. FIG. 7 shows an example of a displayed listing 520 of possible options which can be scrolled through according to one embodiment of the invention. Among the available options that can be scrolled through are "open" (i.e., open the data object), "read" (i.e., read/view the data object), "write" (i.e., insert new textual content), draw (i.e., draw new pictorial or graphical content), "edit" (i.e., edit existing content), "copy" (i.e., copy existing content), "forward" (i.e., forward the data object to another user), "move" (i.e., move the data object from one location to another), "rename" (i.e., rename the data object), "combine" (i.e., combine two data objects), "show details" (i.e., show any available detailed information relating to the data object), and "use the subject number" (i.e., explicitly assign a subject number to a data object). Another option, for example, may be to attach a new message to a prestored data object. The desired method of activation is initiated, such as by pressing on a "select" button 530 (step 330). For example, the read command 520a is selected by highlighting the displayed command and pressing on the select button 530. The available selections of ways to activate the data object will of course depend on the type of data object. An audio clip data object may have, for example, an additional available option for selecting a command to listen to the audio clip, or other commands to otherwise perceive the content of the data object. The user's scrolling through a list of data objects is generally not considered as an activation because scrolling is too remote an action to be considered as a manifestation of the user's emotional connection to a communication partner.

As shown in FIG. 3B embodying the invention, a user turns on the notification feature at step 320 (alternatively, the feature may be turned on at an earlier time or left on permanently). Thereafter, whether immediately or at some later time, the user activates a data object at step 330. The system then notifies the particular communication partner who is associated with the data object of the activation of the data object by sending a notifying message (step 340). The speed at which the notifying message is sent ("substantially instantly") depends upon the system speed so the notifying message may take a few seconds or even a minute or two to send. However, it should not take too long (e.g., one hour or more). (Similarly, the system may be set to send notifying messages to someone other than the particular communication partner in lieu of or in addition to sending notifying messages to the communication partner.) This notifying message may be a simple notifying message that is similar for all of the types of data objects and types of activations. The sender need not be identified. However, where the sender is identified, a simple notifying message is to be sent, and terminal 100 is only used by a single user, the content of the notifying message sent over the link 125 need only identify the sending terminal 100. This information will identify the sender. Otherwise, where multiple users use terminal 100 and the sender is to be identified in the notifying message, the current user of terminal 100 will have to identify herself to the terminal. This simple notifying message may also identify to the receiver of the notifying message the type of data object activated. The activation may also comprise more specific information, such as the identity of the type of activation, and possibly also its contents, and/or the type of activation. Where the sending terminal 100 is only used by a single user, the information content sent over the link 125 need only identify the sending terminal 100, which will identify the sender, and the type of data, i.e. notification about activation of the data objects, that is being sent. Regardless, only a small amount of information must be sent to provide a notifying message.

The notification interface informing the communication partner at terminal 110 that the subject's data objects of the communication partner have been activated in another remote terminal should be intimate and attention catching, and preferably unobtrusive to others. An optimal solution is a tactile interface 218 at the terminal 10 that imparts some tactile sensation to the receiving party at terminal 110 such as a vibration, a deformation, such as the deformation of an element protruding from the device wherein the device or a portion thereof expands, a change in temperature, like by passing current through a heating element (not shown) to impart warmth to the receiving party, or a fan to blow air at the user. Instead of integrating the tactile interface into terminal 110, the tactile interface may be part of external notification device 135 linked to terminal 110 with a short range wireless communication link 130 such as a Bluetooth link. The notification device 135 may be designed to be worn by the receiver of the message. Auditory or visual notifying messages, such as background sounds or changes in illumination, are also possible alternatives to a tactile notification in a situation when an ambient background interface can be constructed, i.e., in a quiet room or study. These auditory or visual notifying messages can similarly be conveyed on terminal 110, such as displaying a visual message on display 202 or playing the message over speaker 221, or they can be further transmitted for conveyance to the communication partner on notification device 135. Terminal 110 may also have multiple types of notification mechanisms, such as a combination of tactile, auditory, and visual modifications. As mentioned earlier, it is advantageous to keep the communication partner effectively apprised of the user's activation of the data objects at terminal 100 in real time. However, asynchronous notifying messages about the activations are also within the scope of the invention.

The receiver of notifying messages may be offered a menu of various types of notifying messages from which to choose, as well as an option of turning off the notification feature so as not to be undesirably disturbed at various inopportune times. The notification system may also be toggled on and off by the user at terminal 100 so that terminal 100 sends no notifying messages or sends notifying messages on a per-communication partner basis so that only certain people receive notifying messages while others do not.

The communication partner at terminal 110 may receive notifying messages from system users having terminals other terminals 100, 110 who may also be activating data objects associated with the subject on their computer as well. Where several people are sending notifying messages to the same communication partner, the receiver of the notifying messages may be supplied an option to have notifying messages from each system user impart a somewhat different type of notification signal. This may involve, for example, different patterns of tactile signals for notifying messages derived from different sources or, as another example, different forms of notifying messages for signal notifications derived from different sources.

The notifying messages may be stored and used by the receiver of these notifying messages in various ways. For example, the receiver can keep track of how often she is receiving these notifying messages from the particular sender.

Figure 8:
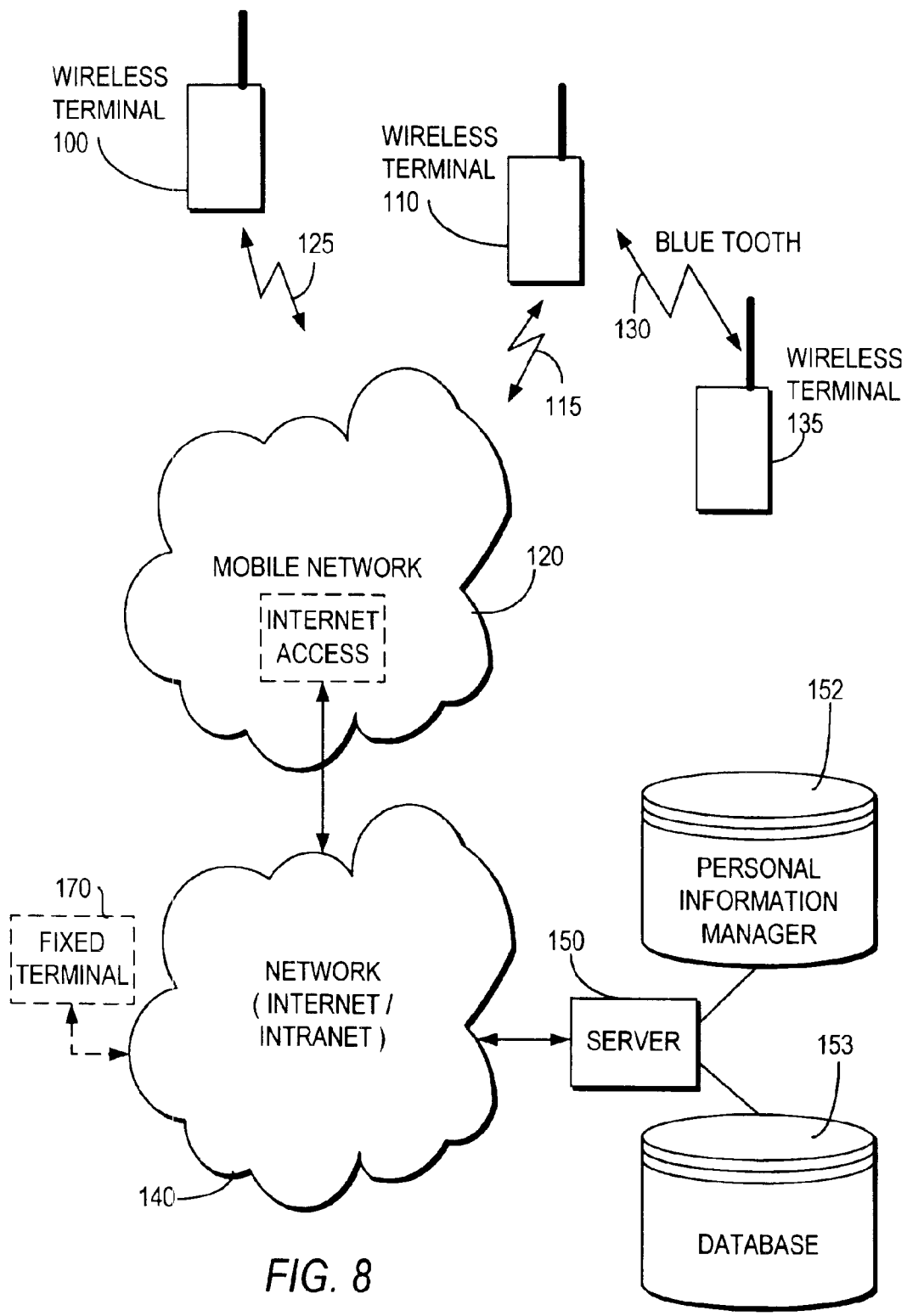
FIG. 8 depicts a block diagram of a second embodiment of the system architecture.

FIG. 8 depicts another embodiment of a system on which the invention may be implemented. In this system, terminal 100 may have network access software 222, such as web access software (a microbrowser), resident on terminal 100 for accessing a network 140, such as the Internet or an intranet via mobile network 120. A server 150 has personal information management-style software 152 and a database 153 containing the directory of communication partners/subjects and the data objects associated with such subjects (if there is separate database for the data objects). The user activates the data objects on the server 150 at terminal 100 using the network access software to access the software 152 at server 150 or software 222 at terminal 100 to track the activation of data objects and generate the notifying messages. Notifying messages generated at server 150 are sent over the network/Internet 140 to the mobile network 120 for transmission to terminal 110. Notifying messages generated at terminal 100 are transmitted to terminal 110 via mobile network 120.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed is:

1. A method of informing a party assoicated with a data object that said data object has been activated by a user of a mobile terminal in which said data object is currently being stored, comprising the steps of:

associating a data object with an associated mobile terminal of an associated party, whereby said associated data object comprises association data identifying at least said associated mobile terminal, wherein said associated mobile terminal has a wireless link with a wireless communication network; and storing said associated data in a memory of a storing mobile terminal, said associated data object being capable of activation by a user or said storing mobile terminal;

whenever a user of said storing mobile terminal activates said associated data object, transmitting a notifying message via the wireless communication network to the associated mobile terminal of the associated party; and when the associated mobile terminal receives said notifying message, presenting an auditory, visual, and/or tactile signal to the associated party thereby informing the associated party that the associated data object stored on the storing mobile terminal has been activated by the user of said storing mobile terminal.

2. The method of claim 1, further comprising the step of:
   storing contact information about the associated party in one of the storing terminal and a network element accessible to the storing mobile terminal.

3. The method of claim 1, wherein said associated data comprises data regarding at least one of a source, originator, target, and subject of said data object.

4. The method of claim 1, wherein the auditory, visual, and/or tactile signal is presented by one of the associated terminal and a device linked to the associated terminal with a short range wireless communication link.

5. The method of claim 1, wherein the notifying message comprises at least one of different types of notifying message available to send to the associated party.

6. The method of claim 5, wherein the step of presenting the auditory, visual, and/or tactile signal to the associated party comprises the step of imparting at least one of different types of vibrations to the associated party depending on which of the at least one of the plural different types of notifying messages has been received.

7. The method of claim 5, wherein the plurality of different types of notifying messages comprises different personalized messages created by the user of the storing mobile terminal.

8. The method of claim 1, wherein the data object comprises at least one of an email, a contact directory entry, a phonebook entry, a short message service message, a text message, an image, a picture, a video clip, an audio clip, and an animation associated with the associated party.

9. The method of claim 1, wherein activating the data object comprises one of accessing, reading, writing, drawing, editing, copying, forwarding, moving, renaming, combining, showing details of, attaching a message to, using, listening to, and viewing the data object.

10. A method of informing a party associated with a data object that said data object has been activated by a user of a mobile terminal in which said data object is currently being stored, comprising the steps of:

associating a data object with a transmitting mobile terminal of a party associated with said associated data object, whereby said associated data object comprises association data identifying at least said transmitting mobile terminal, wherein said transmitting mobile terminal has a wireless link with a wireless communication network;

transmitting, by said transmitting mobile terminal, said associated data object via the wireless communication network to a storing mobile terminal;

receiving, by said storing mobile terminal, said associated data object and storing said associated data object in a memory of said storing mobile terminal, said associated data object being capable of activation by a user of said storing mobile terminal;

whenever a user of said storing mobile terminal activates said associated data object, transmitting a notifying message via the wireless communication network to the transmitting mobile terminal of the associated party; and when the transmitting mobile terminal receives said notifying message, presenting a tactile signal to the associated party, wherein said tactile signal uniquely identifies at least one of the following: the associated data object, the storing mobile terminal, and/or the user of the storing mobile terminal;

wherein said tactile signal thereby informs the associated party at least one of the following: the associated data object has been activated on a mobile terminal, the associated data object has been activated on the storing mobile terminal, and/or the associated data object has been activated by the user of the storing mobile terminal.

11. A method of informing a party associated with an electronic representation that said electronic representation has been activated by a user of a mobile terminal in which said electronic representation is currently being stored, comprising the steps of:

associating an electronic representation with an associated mobile terminal of an associated party, whereby said associated data object comprises association data identifying at least said associated mobile terminal, wherein said associated mobile terminal has a wireless link with a wireless communication network;

transmitting said associated data object from the associated mobile terminal to a storing mobile terminal;

storing said associated data object in a memory on said storing mobile terminal, said associated data object being capable of activation by a user of said storing mobile terminal;

whenever a user of said storing mobile terminal activates said associated data object, transmitting a notifying message via the wireless communication network to the associated mobile terminal of the associated party; and when the associated mobile terminal receives said notifying message, presenting a tactile signal to the associated party, wherein said tactile signal uniquely identifies at least one of the following: the associated data object, the storing mobile terminal, and/or the user of the storing mobile terminal;

wherein said tactile signal thereby informs the associated party at least one of the following: the associated data object has been activated on a mobile terminal, the associated data object has been activated on the storing mobile terminal, and/or the associated data object has been activated by the user of the storing mobile terminal.

12. A telecommunication system comprising:

an associated mobile terminal of an associated party, capable of associating itself with a data object, whereby said associated data object comprises association data identifying at least said associated mobile terminal, and capable of transmitting said associated data object, wherein said associated mobile terminal has a communication link with the telecommunication network; and a storing mobile terminal capable of storing said associated data object in a memory, said associated data object being capable of activation by a user of said storing mobile terminal;

wherein, whenever the user of said storing mobile terminal activates said associated data object, a notifying message is transmitted via the telecommunication network to the associated mobile terminal of the associated party; and wherein, when the associated mobile terminal receives said notifying message, an auditory, visual, and/or tactile signal is presented to the associated party thereby informing the associated party that the associated data object stored on the storing mobile terminal has been activated by the user of said storing mobile terminal.

13. The system of claim 12, further comprising:

a storage in one of the storing terminal and a network element accessible to the storing mobile terminal, said storage for storing contact information about the associated party.

14. The system of claim 12, wherein said associated data comprises data regarding at least one of a source, originator, target, and subject of said data object.

15. The system of claim 12, wherein the auditory, visual, and/or tactile signal is presented by one of the associated terminal and a device linked to the associated terminal with a short range wireless communication link.

16. The system of claim 12, wherein the notifying message comprises at least one of a plurality of different types of notifying messages available to send to the associated party.

17. The system of claim 16, wherein the auditory, visual, and/or tactile signal presented to the associated party comprises at least one of different types of vibrations depending on which of the at least one of the plural different types of notifying messages has been received.

18. The system of claim 16, wherein the plurality of different types of notifying messages comprises different personalized messages created by the user of the storing mobile terminal.

19. The system of claim 12, wherein the data object comprises at least one of an email, a contact directory entry, a phonebook entry, a short message service message, a text message, an image, a picture, a video clip, an audio clip, and an animation associated with the associated party.

20. The system of claim 12, wherein the associated data object is activated one of accessing, reading, writing, drawing, editing, copying, forwarding, moving, renaming, combining, showing details of, attaching a message to, using, listening to, and viewing the data object.

21. A mobile terminal comprising:

a network transceiver for receiving from, and transmitting to, a mobile network;

a central processing unit capable of associating the mobile terminal with a data object, whereby said associated data object comprises association data identifying at least said associated mobile terminal, wherein said associated data object is capable of being transmitted to another mobile terminal;

data storage capable of storing an associated data object; and input capable of activating an associated data object;

wherein, whenever a user of the mobile terminal activates an associated data object, a notifying message is transmitted to the mobile terminal associated with said associated data object; and wherein, when the mobile terminal receives a notifying message, an auditory, visual, and/or tactile signal is presented to the user thereby informing the user that an associated data object stored on another mobile terminal has been activated by the user of said other mobile terminal.

22. The mobile terminal of claim 21, wherein said associated data comprises data regarding at least one of a source, originator, target, and subject of said data object.

23. The mobile terminal of claim 21, wherein the auditory, visual, and/or tactile signal is presented by one of the mobile terminal and a device linked to the mobile terminal with a short range wireless communication link.

24. The mobile terminal of claim 21, wherein the notifying message comprises at least one of a plurality of different types of notifying messages.

25. The mobile terminal of claim 24, wherein the auditory, visual, and/or tactile signal presented to the user comprises at least one of different types of vibrations depending on which of the at least one of the plural different types of notifying messages has been received.

26. The terminal of claim 24, wherein the plurality of different types of notifying message comprises different personalized messages created by the user.

27. The mobile terminal of claim 21, wherein the data object comprises at least one of an email, a contact directory entry, a phonebook entry, a short message service message, a text message, an image, a picture, a video clip, and an animation associated with the associated party.

28. The mobile terminal of claim 21, wherein the data object is activated one of accessing, reading, writing, drawing, editing, copying, forwarding, moving, renaming, combining, showing details of, attaching a message to, using, listening to, and viewing the data object.

* * * * *